United States Patent
Gosset

(10) Patent No.: US 7,416,072 B2
(45) Date of Patent: Aug. 26, 2008

(54) MACHINE FOR TRANSFERRING OBJECTS ALIGNED IN ROWS

(75) Inventor: François Gosset, rue de la Vallée (FR)

(73) Assignee: Cermex Ouest Conditionnement, Lisieux (FR)

( * ) Notice: Subject to any disclaimer, the term of this patent is extended or adjusted under 35 U.S.C. 154(b) by 525 days.

(21) Appl. No.: 10/534,762

(22) PCT Filed: Oct. 23, 2003

(86) PCT No.: PCT/FR03/03138

§ 371 (c)(1),
(2), (4) Date: May 13, 2005

(87) PCT Pub. No.: WO2004/046000

PCT Pub. Date: Jun. 3, 2004

(65) Prior Publication Data

US 2006/0060448 A1    Mar. 23, 2006

(30) Foreign Application Priority Data

Nov. 15, 2002    (FR) .................................. 02 14314

(51) Int. Cl.
*B65G 25/00*    (2006.01)
(52) U.S. Cl. ................... 198/429; 198/431; 198/457.01
(58) Field of Classification Search ................. 198/416, 198/429, 430, 431, 579, 457.01
See application file for complete search history.

(56) References Cited

U.S. PATENT DOCUMENTS

| | | | | |
|---|---|---|---|---|
| 2,941,650 A | * | 6/1960 | Clinton | 198/430 |
| 3,687,262 A | * | 8/1972 | Campbell et al. | 198/430 |
| 3,960,266 A | * | 6/1976 | Becker | 198/430 |
| 4,012,893 A | | 3/1977 | Weber | |
| 4,141,442 A | * | 2/1979 | Cole et al. | 198/429 |
| 4,274,532 A | * | 6/1981 | Johnson | 198/429 |
| 4,724,947 A | * | 2/1988 | Opperthauser | 198/433 |
| 5,186,306 A | * | 2/1993 | Sjostrand | 198/442 |
| 5,628,614 A | * | 5/1997 | Pazdernik et al. | 414/790.3 |
| 5,758,474 A | * | 6/1998 | Ziegler | 53/447 |
| 7,051,861 B2 | * | 5/2006 | Stephens et al. | 198/426 |

FOREIGN PATENT DOCUMENTS

| | | |
|---|---|---|
| EP | 0 519 486 A1 | 12/1992 |
| EP | 0 631 993 A1 | 1/1995 |
| FR | 2 820 730 A1 | 8/2002 |
| GB | 1183475 | 3/1970 |
| GB | 2 174 667 A | 11/1986 |
| GB | 2 342 908 A | 4/2000 |

* cited by examiner

Primary Examiner—Douglas A Hess
(74) Attorney, Agent, or Firm—Sughrue Mion, PLLC

(57) ABSTRACT

A machine for transferring in successive rows objects initially aligned on a first conveyor. A second conveyor comprises a tray lateral to the first conveyor and a device for displacing objects with at least one push-member mobile transversely to the first conveyor such that it is urged into lateral contact with n objects on the first conveyor to push them back together in a row onto the tray along a direction forming an angle θ ranging between 0 and 90° exclusively relative to the first conveyor. Thus, the objects have speed components which are never null along the directions of movement the conveyors.

20 Claims, 5 Drawing Sheets

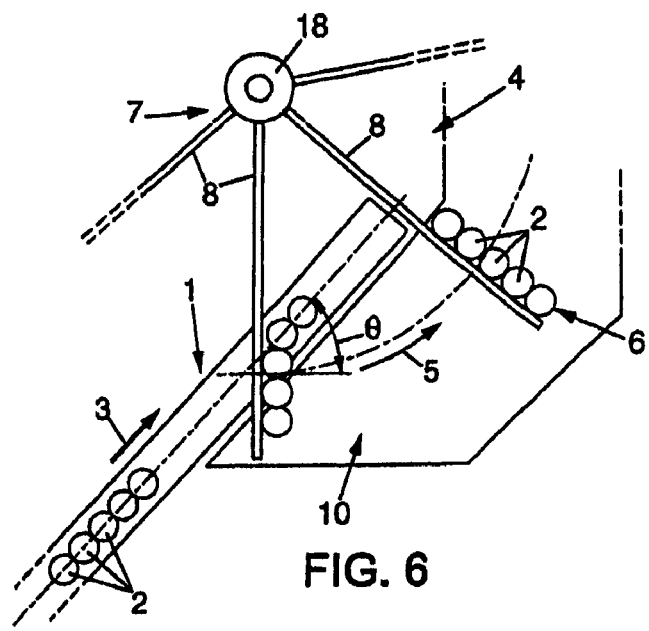
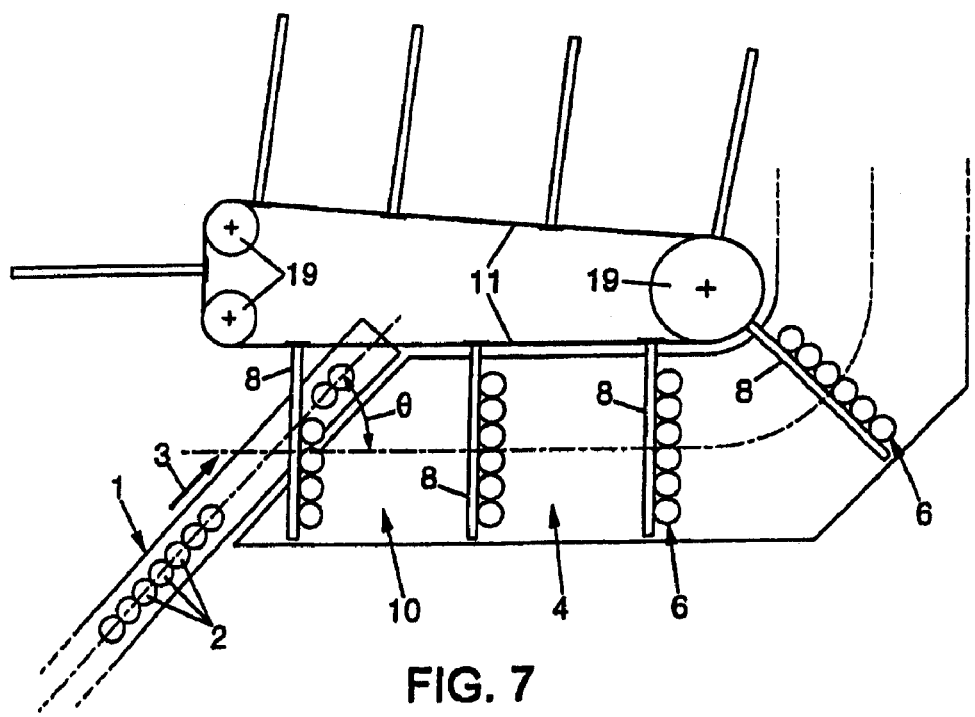

MACHINE FOR TRANSFERRING OBJECTS ALIGNED IN ROWS

BACKGROUND OF INVENTION

The present invention relates to the field of transferring objects, and more specifically it relates to the transfer in successive rows of initially aligned objects.

DESCRIPTION OF RELATED ART

Document GB-A-2 174 667 describes a machine for transferring objects comprising:
- a first conveyor suitable for bringing the objects placed in line one after the other,
- a second conveyor extending perpendicularly to the first conveyor with its entrance end adjacent to the latter,
- and a pushing bar extending transversely to the direction of the second conveyor and movable parallel to the direction of the latter so that it comes into lateral contact with n objects on the first conveyor in order to push them together, in a row, onto the second conveyor.

The fact that, in this known machine, the first and second conveyors are perpendicular to one another constitutes a marked drawback due to the change of direction of movement of the objects, corresponding to the transfer from the first conveyor onto the second conveyor under the action of the pushing bar, which causes a canceling out of speed of the objects in the direction of movement of the first conveyor, immediately accompanied by a speeding up of the objects in the direction of the second conveyor. In other words, the objects undergo a first deceleration in the direction of movement of the first conveyor, followed by a second acceleration in the direction of movement of the second conveyor.

If the pushing bar acted directly on the objects reaching it, the initial deceleration and the following acceleration would be very considerable, and the objects would be unbalanced and would fall over.

To lessen this abruptness of the transfer, this document proposes to mount the pushing bar on a carrier mobile parallel to the first conveyor, the bar remaining movable, relative to the carrier, parallel to the second conveyor. It then becomes possible, by combining the two possible movements of the pushing bar, to transfer the objects from one conveyor to the other on more or less complex trajectories which substantially reduce the degree of the accelerations sustained by the objects.

However, the machine thus equipped becomes complex and costly.

In addition, a change of trajectory of an angular amplitude of 90° may not suit all users.

SUMMARY OF INVENTION

The essential aim of the invention is to propose a perfected solution which keeps the machine to a simple structure while avoiding the aforementioned disadvantages.

For this purpose, the invention proposes a machine for transferring initially aligned objects in successive rows, comprising a first conveyor suitable for bringing the objects placed in line one after the other, characterized in that it comprises a second conveyor comprising a tray placed to the side of the first conveyor and means of moving objects with at least one pushing member movable transversely to the first conveyor so that it comes into lateral contact with n objects on the first conveyor to push them together in a row on the abovementioned tray while moving them in a direction making an angle θ lying between 0 and 90°, limits excluded (θ≠0, θ≠90°) relative to the first conveyor.

Thanks to this arrangement, while keeping a machine of simple structure, the objects have speed components in the directions of movement of the two conveyors that are never zero: this reduces the magnitude of the accelerations or decelerations sustained by the objects and the result is a greater stability of the objects when passing from one conveyor to the other. The result is the possibility of increasing the speed of transfer of the objects, an advantage which fits perfectly with the current concern of the packagers who wish, as far as possible, to use a minimum number of packaging lines operating at as high a speed as possible.

In order that the transfer is carried out in the best conditions, it is desirable that the angle between the two conveyors lies between approximately 20° and 70°, the optimum result being obtained for an angle of approximately 45° for which the variation of the speed components is minimal.

In a practical embodiment, the second conveyor is suitable for moving the objects on a substantially rectilinear trajectory and the second conveyor comprises several pushing members which are substantially parallel and supported by endless running support means extending in a plane approximately perpendicular to the plane of transfer of the objects. Said endless running support means may then comprise an endless chain supporting the pushing members overhanging at one of their ends; or, as a variant, said endless running support means may comprise two parallel endless chains supporting pushing members by the respective ends of the latter.

In another possible embodiment, the second conveyor is suitable for moving the objects on a curvilinear trajectory and this second conveyor comprises several pushing members supported by support means mobile on a partially closed curvilinear trajectory parallel to said trajectory of the objects. It can then be arranged for the support means to be rotatable about a vertical shaft and for the pushing members to be radiating in an overhanging manner, or else for the support means to comprise at least one endless chain opening out in a curvilinear manner parallel to the tray and for the pushing members to radiate in an overhanging manner.

In one embodiment, the first conveyor moves the objects placed one after the other and each pushing member is brought laterally to the first conveyor in order to contact the first n objects present on said first conveyor, the objects on the first conveyor then being able to be juxtaposed to one another or to be separated from one another by a given pitch.

In another embodiment, the objects on the first conveyor are separated from one another by a given pitch and the pushing member is interposed between the object numbers n and n+1 (counted from the first object at the head of the first conveyor). In this case, if the objects are moved by the first conveyor while being to one another, separator means are associated with the first conveyor (for example of the rotating star wheel type) suitable for separating the objects from one another at a given pitch.

In another embodiment, the first conveyor is associated with grouping means suitable for establishing a given gap between the object numbers n and n+1 (counted from the first object at the head of the first conveyor) and the pushing member is interposed into the gap created between said object numbers n and n+1.

In practice, irrespective of the embodiment, it may be advantageous for the pushing members to be bars.

BRIEF DESCRIPTION OF DRAWINGS

The invention will be better understood on reading the detailed description that follows of certain preferred embodiments given only as nonlimiting examples. In this description, reference is made to the appended drawings in which:

FIGS. 6 and 7 are schematic representations of respectively two other embodiments according to the invention.

DETAILED DESCRIPTION OF THE EXEMPLARY EMBODIMENTS

Figure 1A:
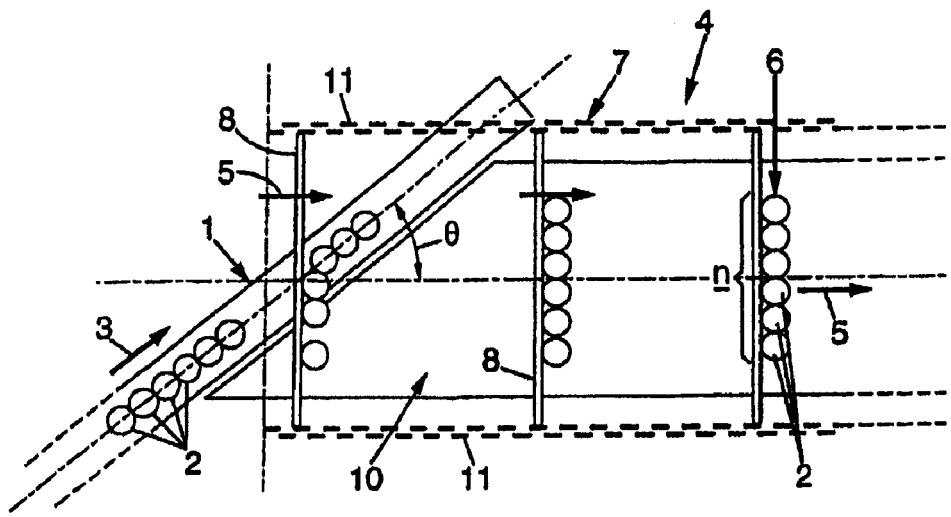
FIGS. 1A and 1B are very schematic representations, respectively in top view and side view, of a transfer machine arranged according to the invention.
Figure 1B:
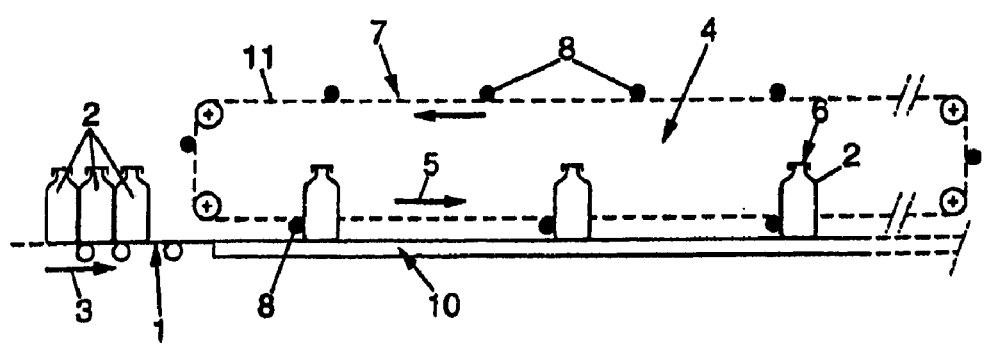

With reference first of all to FIGS. 1A and 1B, a first conveyor 1 (motor-driven conveyor, for example of the belt or tray conveyor type, or motorless conveyor) brings (arrow 3) objects 2 (for example bottles as illustrated) disposed in line one after the other; in the example illustrated, the objects 2 are juxtaposed to one another, although this disposition is not necessary as will appear hereinafter.

A second conveyor 4 clears (arrow 5) the objects 2 disposed in successive rows 6 of n objects abreast.

For this purpose, the second conveyor 4 comprises objects movement means 7 with at least one pushing member made up in the form of a pushing bar 8 which is movable (arrow 5) in order to be brought into lateral contact with n objects aligned on the first conveyor to push them, together, onto a tray 10 of the second conveyor where they are disposed in a row of n objects. The tray 10 extends laterally to the first conveyor 1 as appears in FIG. 1A.

The first and second conveyors 1 and 4 are disposed so that the directions 3, 5 of transfer of the objects on the first and second conveyors 1 and 4 respectively form an angle θ between them.

According to the invention, the angle θ formed by the two conveyors 1 and 4 lies between 0 and 90°, limits excluded (that is to say θ is neither 0—the two conveyors 1 and 4 are not parallel—, nor equal to 90°—the two conveyors are not perpendicular to one another).

Figure 1C:
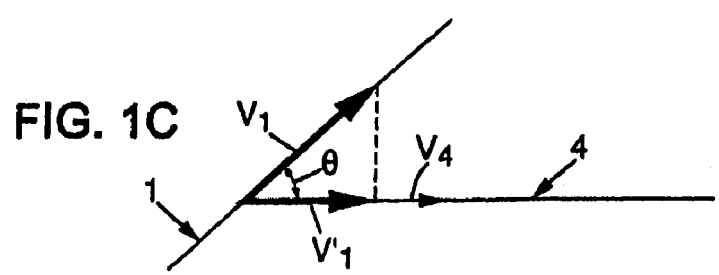
FIG. 1C is a graph explaining geometrically the advantage obtained by the arrangement of the transfer machine of FIGS. 1A and 1B.

This disposition ensures that the objects are transferred from the first conveyor 1 to the second conveyor 4 without a sudden loss of speed on exiting the first conveyor 1 and without a sudden increase of speed on entering the second conveyor 4. In FIG. 1C, a vector $V_1$ represents the speed of the objects 2 on the first conveyor 1 (schematized by the axis 1). The vector $V_1$ is directed in the direction of movement of the conveyor 1 and forms an angle θ with the second conveyor 4 (schematized by the axis 4). The vector $V_1$ is projected onto the axis 4 as a vector $V_1'$ such that $$V_1' = V_1 \cos \theta$$

It can therefore be seen that, during its transfer onto the second conveyor 4, each object 2 already has a speed component $V_1'$ in the direction of movement of the second conveyor and that, if the pushing bar 8 of the second conveyor 4 moves at a speed $V_4$, the increase in speed sustained by each object is $V_4-V_1'$, or $V_4-V_1 \cos \theta$. This reduces the accelerations to which the objects are subjected during the transfer from one conveyor to the other and this then increases the stability of the objects. It can in particular be arranged so that $V_4=V_1$, in which case the increase of speed is equal to $V_1(1-\cos \theta)$.

In practice, the arrangements according to the invention seem that they must offer the best advantages if the angle θ lies between approximately 20° and 70°. For given speeds $V_1$ and $V_4$, the most advantageous result is obtained for an angle θ of approximately 45° (the case illustrated in FIGS. 1A and 1C).

For the practical embodiment of the main dispositions that have just been given, use is made of the following arrangements.

With respect to the object movement means 7, the use of a single pushing bar with alternating movement as illustrated in the aforementioned document GB-A-2 174 667 does not seem very practical due to the relatively long travel and above all due to its alternating movement which prevents the achievement of high rates desired by the users.

In the context of the present invention, it is therefore proposed to arrange, in a first embodiment, the object movement means 7 with several pushing bars 8 evenly spaced and parallel with one another, which are supported by endless running support means 11 (such as at least one endless chain). Said support means extend in a plane approximately perpendicular to the tray 10 and move the bars 8 in the vicinity of the surface of the conveyor 1 and of the tray 10 in the pushing phase of the objects 2 and above the objects in the return phase. Finally these means may appear as illustrated in FIG. 1B, in the form of an endless chain 11 which supports a plurality of evenly spaced pushing bars 8 which roll round in a closed loop on idler pulleys on any required trajectory.

Two arrangements can be envisaged.

In the example illustrated in FIG. 1A, the object movement means 7 comprise two endless chains 11 disposed parallel with one another above the plane of transfer formed by the first conveyor 1 and the tray 10 of the second conveyor 4, and on either side of or on the sides of the latter. Thus, the pushing bars 8 are supported at their two ends respectively by the two endless chains 11.

Figure 3:
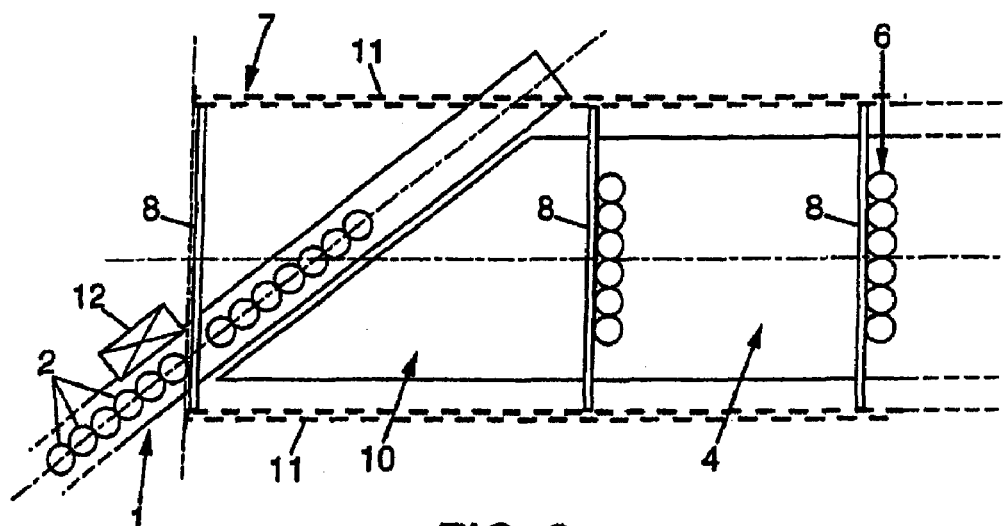
Figure 4:
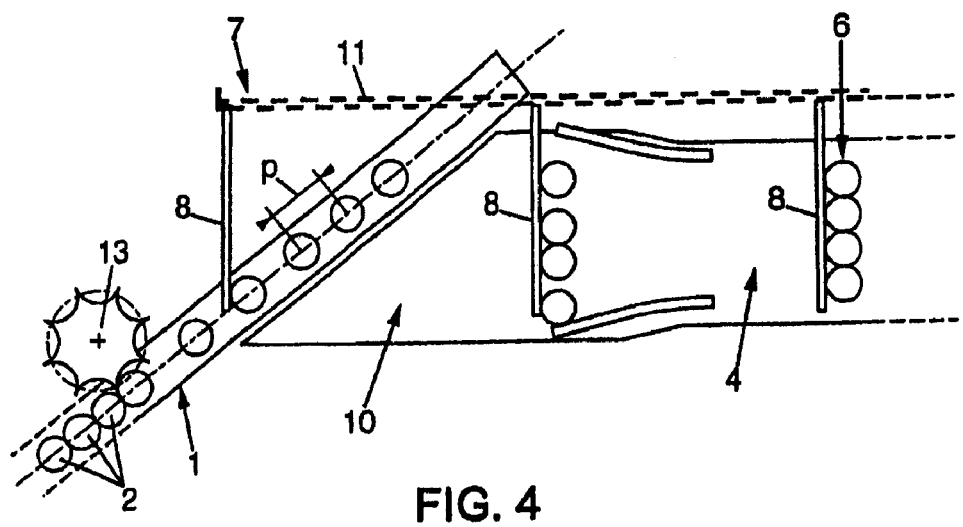

In this case, each pushing bar 8 needs to be introduced perpendicularly between two consecutive objects present on the first conveyor 1. The simplest embodiment consists in bringing the bars 8 from above, as illustrated in FIGS. 1A and 1B. It is therefore necessary:

either to separate the groups of n objects as illustrated in FIG. 3, by implementing separator means 12 of any appropriate type known to those skilled in the art (for example lateral separator with intermittent brake), or to systematically separate all the objects 2 by a given pitch p as illustrated in FIG. 4, by implementing spacing means 13 of any appropriate type known to those skilled in the art (for example rotating star wheel), if the conveyor 1 receives the objects juxtaposed as illustrated in FIGS. 1A, 1B.

Figure 2:
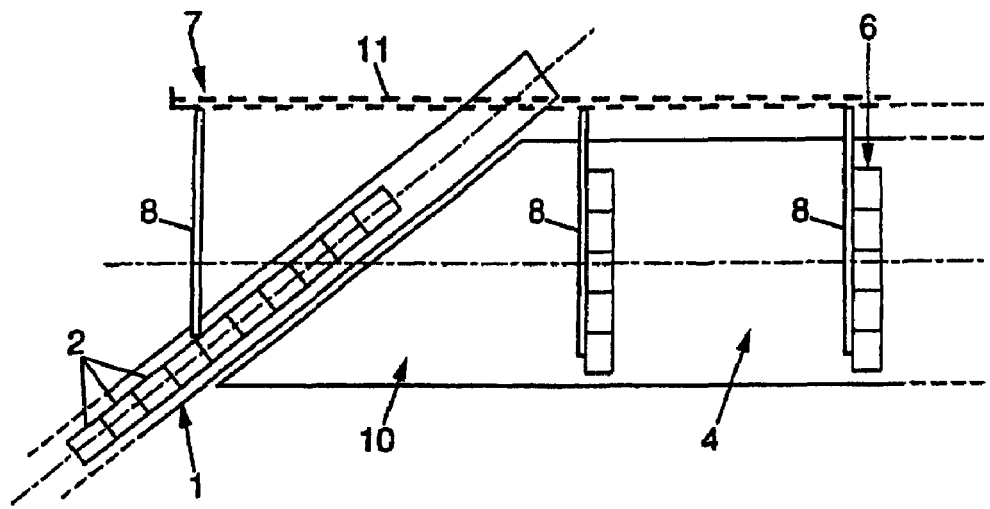
FIGS. 2 to 4 are very schematic representations, in top view, of various variant embodiments of a transfer machine arranged according to the invention.

In the example illustrated in FIGS. 2 and 4, the object movement means 7 comprise a single endless chain 11 disposed unilaterally and supporting the pushing bars 8 in an overhanging manner at just one of their ends. Such an arrangement may be used in the same conditions as explained hereinabove, with spacing of the objects 2 or groups of objects 2.

However, this arrangement with pushing bars overhanging has the additional advantage of being able to be implemented with juxtaposed objects, as illustrated in FIG. 2. Each pushing bar 8 is then brought via the side of the first conveyor 1 which is opposed to the second conveyor 4, so that its free end comes into contact laterally with the object number n to push the latter, then successively the others. The implementation of this arrangement requires the objects to be sufficiently large to be sure that the free end of each pushing bar contacts only the object number n, without touching the object number n+1; this arrangement may be suitable in particular (although this is not exclusive) for moving objects having flat faces, such as "bricks" as illustrated in FIG. 2.

Figure 5:
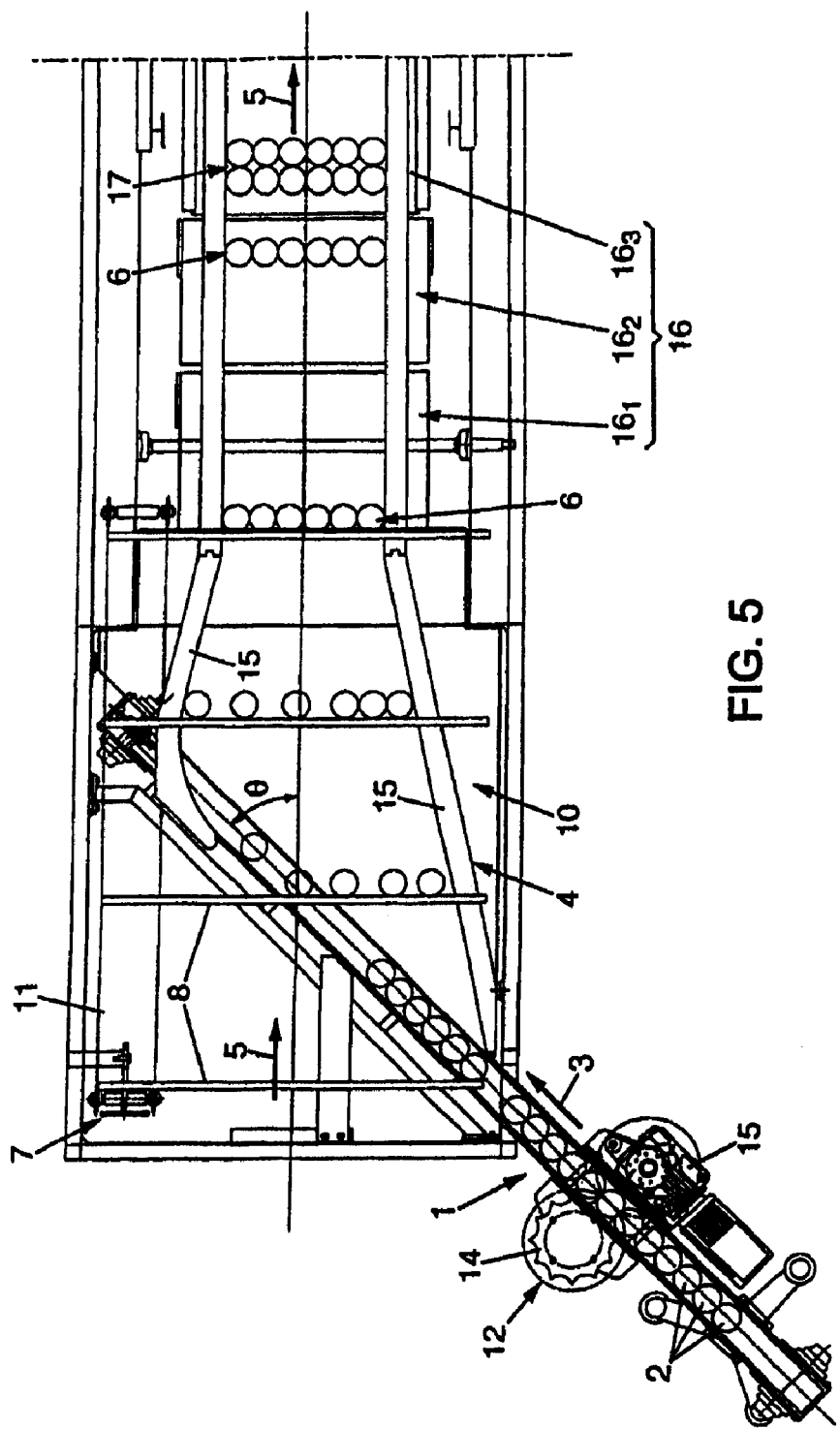
FIG. 5 is a top view of a concrete example of a transfer machine according to the invention.

FIG. 5 illustrates a top view of a concrete example of a transfer machine implementing the arrangements according to the invention. In this example, the objects 2, carried along by the first conveyor 1 and juxtaposed one after the other, are separated into groups of six aligned objects by the separator means 12 here taking the form of a rotating star wheel 14 driven by means 15 arranged to cyclically cause a space between two objects. The object movement means 7 of the second conveyor 4 are of the pushing bar 8 type supported in an overhanging manner by a unilateral chain 11. Guides 15 are associated with the tray 10 to guide the objects (resting against a pushing bar 8) moving on the tray 10 of the second conveyor 4, so as to assemble and keep the n objects juxtaposed in a row 6. In the example illustrated in FIG. 5, the second conveyor 4 brings the rows 6 of objects to a third conveyor 16 (for example a motorized conveyor of the belt or tray conveyor type, itself consisting of a succession of conveyors $16_1$, $16_2$, $16_3$ having different speeds in order to receive the successive rows 6 of objects without the latter sustaining excessive decelerations, on the one hand, then finally so as to assemble several successive rows in order to form a batch 17 of a plurality of objects 2 assembled in lines and columns, for example to feed a packaging machine.

In the examples given in FIGS. 3 to 5, it is indicated that the pushing bars 8 were brought from above into the gaps between the objects or groups of objects, because this is the technical solution which seems the simplest due to the fact that the bars 8 are then moved above the conveyor 1 and the tray 10. However, if necessary and technically feasible, the bars could equally be brought from below into said gaps.

FIG. 6 illustrates another embodiment in which the object movement means 7 are of the rotary type, with a vertical axis hub 18 supporting the radiating pushing bars 8. The hub 18 may be disposed in such a manner that each pushing bar 8 arrives above the first conveyor 1 at an angle θ as defined hereinabove: the angle θ here is the angle formed between the center line of the first conveyor 1 and the tangent to the circular trajectory (arrow 5) of the bar 8 in the place where the latter intersects the center line of the conveyor 1. The objects 2 are then pulled, by each pushing bar 8, into a row 6 on an arced trajectory. The tray 10 is arranged in consequence and it may advantageously be fitted with an external guide such that the objects 2, aligned in a row 6 and bearing against the bar 8, follow an arced trajectory without drifting outward.

FIG. 7 illustrates another embodiment which combines the aforementioned dispositions. The objects movement means comprise a support means 11 elongated in a closed loop such as an endless chain which winds around any curvilinear contour desired: elliptical, oval, or other contour. The objects may then be carried along a complex path, for example a substantially rectilinear section followed by an arced section, as illustrated in FIG. 7. The support means 11 is then supported by wheels 19 disposed and dimensioned in the manner required to suit the trajectory (arrow 5) to be achieved.

Note also that it is possible to produce transfer machines of greater capacity, comprising several first conveyors disposed parallel with one another and a second, wide conveyor or several second conveyors disposed parallel to one another, the pushing bar movement means engaging the objects simultaneously on the first conveyors and transferring them in a row or rows onto the second conveyor or onto the second conveyors simultaneously.

In the various examples explained hereinabove, it has been considered that each pushing member was made in the form of a bar. This bar may be made in any appropriate form: single bar as illustrated in the drawings, bar with notches or recesses shaped to suit the shape of the objects, bar bent at the end (particularly for conveyors 4 of the rotating type, in order to prevent the objects from sliding outward under the action of centrifugal force), etc. The pushing members may also be made in any other form appropriate to the pushing function: plate, set of palettes, etc.

The invention claimed is:

1. A machine for transferring initially aligned objects in successive rows, comprising a first conveyor having a first displacement direction and arranged for supplying the objects placed in line one after the other along said first displacement direction, wherein said machine comprises:
   a second conveyor comprising a fixed tray placed to the side of said first conveyor and extending transversely to said first displacement direction along a second direction, and
   object moving means provided with at least one pushing member movable transversely to said first conveyor along said second direction,
   wherein said pushing member comes into lateral contact with n objects on said first conveyor and push them together on said tray being arranged in one row extending substantially perpendicularly to said second direction while moving them in said second direction, and
   wherein said first and second directions are mutually arranged with an angle θ between 0 and 90°, limits excluded (θ≠0, θ≠90°),
   whereby the objects have speed components in the directions of movement of said first and second conveyors, respectively, which are never zero.

2. The machine as claimed in claim 1, wherein said first and second conveyors are mutually arranged with an angle θ between approximately 20° and 70°.

3. The machine as claimed in claim 1, wherein said first and second conveyors are mutually arranged with an angle θ of approximately 45 °.

4. The machine as claimed in claim 1, wherein said second conveyor is adapted for moving the objects on a substantially rectilinear trajectory, and wherein said second conveyor comprises several pushing members which are substantially parallel and supported by endless running support means extending in a plane approximately perpendicular to the plane of transfer of the objects.

5. The machine as claimed in claim 4, wherein said endless running support means comprise an endless chain supporting pushing members which have each at least one end and wherein said pushing members overhang said endless chain at said respective ends.

6. The machine as claimed in claim 5, wherein said first conveyor moves the objects placed one after the other, and wherein each pushing member is brought laterally to said first conveyor in order to contact the first n objects present on said first conveyor.

7. The machine as claimed in claim 6, wherein the objects on said first conveyor are juxtaposed to one another.

8. The machine as claimed in claim 7, wherein the objects are juxtaposed one after the other on said first conveyor, and wherein said machine comprises, associated with said first conveyor, separator means adapted for separating the objects from one another by a given pitch.

9. The machine as claimed in claim 6, wherein the objects on said first conveyor are separated from one another by a given pitch.

10. The machine as claimed in claim 5, wherein the objects on said first conveyor are separated from one another by a given pitch, and wherein said pushing member is interposed between the object numbers n and n+1 (counted from the head object on said first conveyor).

11. The machine as claimed in claim 5, wherein grouping means adapted for imparting a given gap between the object numbers n and n+1, which are counted from the head object on said first conveyor, are associated with said first conveyor, and wherein said pushing member is interposed in the gap created between said object numbers n and n+1.

12. The machine as claimed in claim 4, wherein said endless running support means comprise two parallel endless chains supporting pushing members which have each two ends and wherein said pushing members are supported by said respective ends thereof.

13. The machine as claimed in claim 1, wherein said second conveyor is adapted for moving the objects on a curvilinear trajectory, and wherein said second conveyor comprises several pushing members supported by support means mobile on a closed curvilinear trajectory which is partially parallel to said trajectory of said objects.

14. The machine as claimed in claim 13, wherein said support means are rotatable about a vertical shaft, and wherein said pushing members are arranged radially overhanging.

15. The machine as claimed in claim 13, wherein said support means comprise at least one endless chain which curvilinearly extends parallel to said tray, and wherein said pushing members are arranged radially overhanging.

16. The machine as claimed in claim 13, wherein said first conveyor moves the objects placed one after the other, and wherein each pushing member is brought laterally to said first conveyor in order to contact the first n objects present on said first conveyor.

17. The machine as claimed in claim 16, wherein the objects on said first conveyor are juxtaposed to one another.

18. The machine as claimed in claim 16, wherein the objects on said first conveyor are separated from one another by a given pitch.

19. The machine as claimed in claim 16, wherein the objects are juxtaposed one after the other on said first conveyor, and wherein said machine comprises, associated with said first conveyor, separator means adapted for separating the objects from one another by a given pitch.

20. The machine as claimed in claim 1, wherein each pushing member is a bar.

* * * * *